Figure 1:
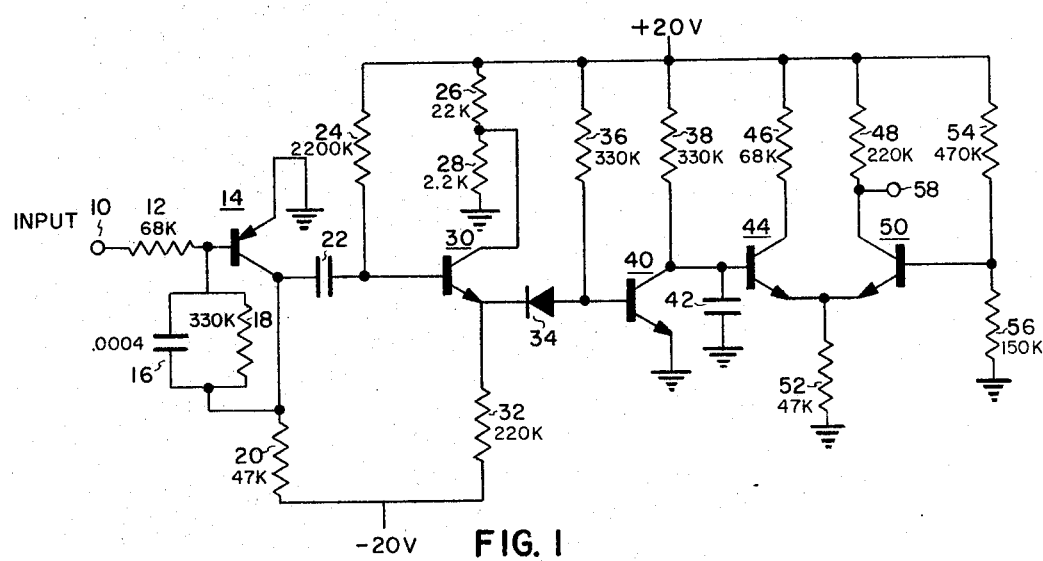

Oct. 4, 1966 M. M. MERLEN ETAL 3,277,311
PULSE WIDTH DISCRIMINATOR SCANNER CIRCUIT
Filed June 10, 1963

INVENTORS
MONTY M. MERLEN
NORMAN J. JOHNSON
BY
*Joseph Levinson*
ATTORNEY

United States Patent Office 3,277,311
Patented Oct. 4, 1966

3,277,311
PULSE WIDTH DISCRIMINATOR SCANNER
CIRCUIT
Monty M. Merlen and Norman J. Johnson, Stamford, Conn., assignors to Barnes Engineering Company, Stamford, Conn., a corporation of Delaware
Filed June 10, 1963, Ser. No. 286,601
4 Claims. (Cl. 307—88.5)

This invention relates to a narrow pulse discriminator circuit.

In a variety of electronic applications, it is desired that the electronic processing circuitry be responsive to repetitive signals of a predetermined pulse width while being nonresponse to undesired unipolar signals of shorter duration. These undesired signals may be due to noise or spurious background signals which accompany the desired signals. For example, in horizon sensors, such as shown and described in Patent No. 3,020,407 by M. Merlen, a joint inventor of the present application, rectangular pulses are generated in the sensor due to the scanning of the earth's horizon. The leading and trailing edges of the rectangular pulses produced by the sensor correspond to the points where the scan of the horizon sensor crosses the horizon. These rectangular pulses have a finite pulse width and are repetitive due to the continuous scanning operation of the sensor. The pulses are separated by finite intervals of little or no signal while the sensor scans space. During the space scanning intervals, undesired pulses of one polarity may may occur due to the fact that the sensor may scan the moon, stars, grazing sun, etc. Since error signals are generated in accordance with the occurence of the repetitive rectangular pulses to correct the attitude of the sensor, if error signals are allowed to be generated in accordance with the undesired signals, faulty operation results. This problem exists in a number of electronic applications in addition to the cited example of the horizon sensor where it is of extreme importance.

It is an object of the invention to provide a pulse discriminator circuit which does not respond to signals which are less than a predetermined duration.

It is a further object of the invention to provide a pulse discriminator circuit which passes desired repetitive signals of predetermined duration while eliminating undesired signals of shorter duration.

A further object of this invention is to provide a pulse discriminator for the elimination of undesired signals of less than a predetermined duration which is reliable and simple.

In carrying out this invention in one illustrative embodiment thereof, a pulse discriminator circuit is provided for passing desired repetitive signals of predetermined duration while discriminating against noise and undesired unipolar signals of shorter duration. A first threshold circuit is also provided to prevent small undesired pulses of the opposite polarity, such as are produced by clouds, from entering the narrow unipolar pulse discriminator. The circuit includes a first threshold means for establishing a threshold voltage level in accordance with a predetermined amplitude of the input signal applied thereto, and a second threshold means for establishing a threshold voltage level in accordance with a predetermined duration of the input signals. Means are provided which are responsive to the second threshold means for producing a signal in response to the desired repetitive input signals of predetermined duration while preventing response to undesired signals of shorter duration.

Figure 2:
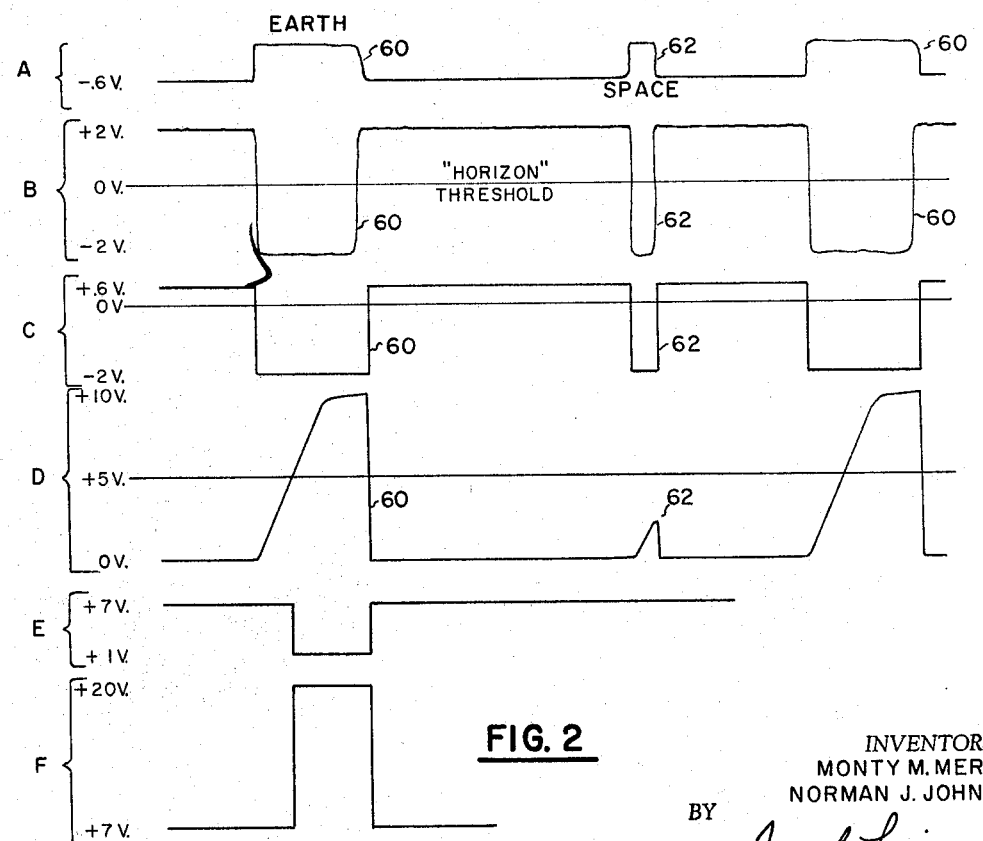

The invention, both as to organization and method of operation, together with further objects and advantages thereof, may best be understood by reference to the following description taken in connection with the accompanying drawings, in which:

FIG. 1 is a schematic diagram of the pulse discriminator circuit embodied in this invention, and FIG. 2 shows a plurality of wave forms appearing at specified points in FIG. 1 which help to illustrate the operation of the circuit of FIG. 1.

The pulse discriminator circuit, as provided in this invention, performs the function of producing an output signal from an input signal which includes repetitive pulses of predetermined duration as well as noise and undesired signals of shorter duration, the output signal being produced only when pulses of the desired predetermined duration are present in the input signals. Since the pulse discriminator circuit performs the aforesaid function regardless of the source of such signals, the invention is restricted only to those applications which require the separation of desired repetitive pulse signals of predetermined duration from signals including unipolar pulses of shorter duration which are undesired. However, since the invention has an important application in the field of horizon sensors, it will be described in connection therewith. The circuit is particularly useful in combination with an input clamp circuit as is shown and described in Patent No. 3,243,604 by N. Johnson, a joint inventor of the present application.

Referring now to FIG. 1, the pulse discriminator circuit embodied in this invention has an input terminal 10 to which input signals are applied. The input signals applied at the input terminal 10 are characterized by having repetitive pulses of a predetermined duration which may be accompanied by noise pulses of shorter duration. These signals are applied via a resistor 12 to a base electrode of a transistor 14 which is connected in a common emitter configuration. The collector electrode of transistor 14 is connected through a load resistor 20 to a source of negative potential. A capacitor 16 and a resistor 18 are connected in parallel between the collector and base electrodes of transistor 14 to provide a feedback path therefor. The transistor 14 functions as an amplifier, with the gain thereof being determined by the ratio of the resistor 12 and the resistor 18. The output of transistor 14 is coupled via a coupling capacitor 22 to a base electrode or a transistor 30. The base electrode of transistor 30 has a bias applied thereto via a resistor 24 which is connected to a source of positive potential. A collector electrode of transistor 30 is connected to the junction of resistors 26 and 28, which form a voltage divider and are connected in series between a source of positive potential and ground. An emitter electrode of transistor 30 is connected through a load resistor 32 to a source of negative potential. The transistor 30 functions to set a first voltage threshold level in accordance with the amplitude of the applied input signal.

The output of the emitter follower stage of transistor 30 is applied via a unilateral conducting device 34 to a base electrode of the transistor 40. The transistor 40 has a common emitter and a bias resistor 36 connected between a source of positive potential and the base electrode of transistor 40. The collector electrode of transistor 40 is connected through a load resistor 38 to a source of positive potential, and the output therefrom is coupled to a base electrode of a transistor 44. A capacitor 42 is connected between the collector electrode of transistor 40 and ground. The unilateral conducting device 34 sets the conduction level of transistor 40. When the unilateral conducting device 34 stops conducting, transistor 40 conducts. A transistor 44 is connected as an emitter follower with the emitter electrode connected through a load resistor 52 to ground and the collector electrode connected through a biasing resistor 46 to a source of positive potential. The output of the transistor 44 is coupled via the load resistor 52 to an emitter electrode of a transistor 50. A base electrode of the transistor 50 is connected to a junction of a voltage divider comprised of resistors 54 and 56 which are connected in series between a source of positive potential and ground, which provide a bias for the base of transistor 50. The collector electrode of transistor 50 is connected via a resistor 48 to a source of positive potential, and the output therefrom is taken from the collector electrode at an output terminal 58. Transistors 44 and 50 function as a second threshold on a time basis. If the signals applied thereto are not of sufficient duration, no output signal appears at the output terminal 58.

For a better understanding of the operation of the circuit of FIG. 1, it will be described utilizing the wave forms appearing on FIG. 2. The waveforms shown on FIG. 2 are approximations utilizing the circuit parameters indicated on FIG. 1, in which all resistors are in kilo-ohms and all capacitors are in microfarads. The waveforms are somewhat idealized for purposes of explanation, and the invention is not considered limited to the circuit parameters shown or the wave forms utilized for purposes of illustration and explanation.

In operation, the waveform A is applied to the input terminal of FIG. 1. The waveform represents the type of signal which may be produced by an horizon sensor in which a series of pulses of predetermined duration 60 correspond to the time interval in which the horizon sensor scans the earth, and which are separated by an interval referred to as the space interval, when the horizon sensor scans space. The signal is normally accompanied by a large amount of noise both on the earth and the space sides, but for purposes of illustration most of this noise has been omitted with the exception of a pulse 62 which is utilized to illustrate the manner in which the circuit operates in discriminating against noise pulses such as pulses 62. Waveform A is amplified and inverted by the grounded emitter transistor amplifier 14, and applied via coupling capacitor 22 to the base electrode of transistor 30. Transistor 30 functions to provide a threshold level in accordance with positive peak amplitude at that point, which is set by the bias level on the collector electrode of transistor 30 furnished from the voltage divider of resistors 26 and 28. In the presence of uniform noise in the space interval, it is set to the positive peaks of the noise. When the signal applied to the base electrode of transistor 30 exceeds the bias on the collector electrode 30, the collector base junction of transistor 30 is biased reversely, thereby causing conduction in transistor 30 which determines the maximum voltage level of waveform B appearing at the emitter electrode of the transistor 30. Since the transistor 30 is connected as an emitter follower, no waveform inversion takes place. The unilateral conducting device 34 is poled to conduct on negative excursions of the waveform B to provide the base electrode of transistor 40 with the waveform C. The unilateral conducting device 34 also compensates for the drop across the transistor 40. When the unilateral conducting device 34 is conducting, transistor 40 is nonconductive, and when unilateral conducting device 34 stops conducting, which is approximately at zero volts in waveform B, transistor 40 conducts. Accordingly, pulses 60 and 62 prevent conduction in transistor 40. When transistor 40 stops conducting, the capacitor 42 is charged through resistor 38 from the source of positive potential. Resistor 38 and capacitor 42 provide a relatively large time constant producing the waveform D on the collector electrode of transistor 40. On the termination of pulses 60 and 62, as shown on the waveforms, transistor 40 becomes conductive, and capacitor 42 discharges through the low impedance path provided by transistor 40. At the same time waveform D is supplied to the base of transistor 44, which produces waveform E at the emitter electrode of transistor 44. Waveform E does not occur unless the capacitor 42 charges up to a predetermined threshold level set in accordance with time. This will be the case with respect to pulses 60 which produce a waveform F at the output terminal 58 of transistor 50. It will be noted that the noise pulse 62 is eliminated by the second threshold level, the result being that any noise that comes through on the space side of the signal tends to turn on transistor 50 but is restricted by the charging of capacitor 42 through the resistor 38. Unless the width of the noise pulse is wide enough to allow the capacitor to charge up sufficiently in accordance with the second threshold level, it does not appear at the output terminal 58.

Although only one noise pulse 62 is illustrated, it will be appreciated that the circuit operates equally well in the presence of extreme amounts of high frequency noise. Such noise is effectively eliminated by the charging of capacitor 42 which discharges rapidly through the conductive transistor 40 when such noise appears. In fact, the aforesaid system has proved operative with signal-to-noise ratios of 0.1. The use of this circuit in combination with the circuit as shown and described in the aforesaid application makes it unnecessary for the circuit of this invention to handle excessively wide noise pulses, such, for example, as the full sun might produce, and which are effectively eliminated by the sungate of the aforesaid application, and allows the present circuit to eliminate narrow noise pulses.

The utilization of the pulse discriminator circuit as embodied in this invention, which includes both an amplitude threshold and a time threshold, provides a simple and reliable solution to the handling of noise which until now has offered great problems in such systems as horizon sensors in which desired repetitive signals are all but lost in the presence of noise, and must be effectively separated therefrom in order that intelligent control functions may be performed by the sensors. These principles may also be applied to other applications having pulse signals of a desired predetermined duration which are to be separated from noise signals of shorter duration.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. A pulse discriminator circuit for processing input signals of predetermined duration which may include undesired signals of shorter duration, comprising
 (a) a first transistor having base, emitter, and collector electrodes, said emitter electrode being connected such that said first transistor operates as an emitter follower,
 (b) means for applying said input signals to said base electrode,
 (c) means for biasing the collector electrode of said first transistor with a predetermined potential whereby said first transistor is conductive on a predetermined amplitude of said input signals,
 (d) a second transistor having base, emitter, and collector electrodes,
 (e) a unilateral conducting device connected between the emitter electrode of said first transistor and the base electrode of said second transistor,
 (f) a resistor,
 (g) a source of potential,
 (h) means for connecting said resistor between said source of potential and the collector electrode of said second transistor,
 (i) means for connecting the emitter electrode of said second transistor to a source of common reference potential, (j) a capacitor connected to the collector electrode of said second transistor and said common reference source, (k) a third transistor having base, collector, and emitter electrodes and being connected in an emitter-follower configuration, the base electrode of said third transistor being connected to the collector electrode of said second transistor, and the collector electrode of said third transistor being coupled to a source of potential, (l) a fourth transistor having base, collector, and emitter electrodes, (m) means for applying a predetermined bias on the base electrode of said fourth transistor, (n) means connecting the emitter electrodes of said third and fourth transistors, and (o) an output terminal connected to the collector electrode of said fourth transistor.

2. A pulse discriminator circuit for processing input signals which have desired repetitive signals of predetermined duration and may include undesired signals of shorter duration comprising:

(a) a first transistor having base, collector and emitter electrodes, the input signals being applied to said base electrode and said emitter electrode coupled to a first source of reference potential, (b) biasing means coupled to said collector electrode for biasing said first transistor to conduct on a predetermined amplitude of said input signals to establish a first threshold level, (c) a second transistor having collector, base, and emitter electrodes with said emitter electrode connected to a common reference source, (d) a unilateral conducting device connected between the emitter electrode of said first transistor and the base electrode of said second transistor and being poled to conduct when said first transistor is conducting, (e) biasing means connected to the base electrode of said second transistor for biasing said second transistor to conduction when said unilateral conducting device is not conducting, (f) an R-C network coupled between a second source of potential, the collector electrode of said second transistor and a common reference source which has a relatively slow time constant, said network charging when said second transistor is not conducting and discharging rapidly through said second transistor when it is conducting, and (g) means having a second threshold level responsive to said R-C network when said R-C network charges to said second threshold level for producing a signal only in response to input signals having the desired repetitive pulses of predetermined duration while producing no signal in response to pulses in the input signals of shorter duration.

3. The pulse discriminator circuit as set forth in claim 2 wherein said R-C network comprises a resistor connected between said second source of potential and the collector electrode of said second transistor and a capacitor connected between the collector electrode of said second transistor and said common reference source.

4. The pulse discriminator circuit set forth in claim 2 wherein said means responsive to said R-C network comprises a third and a fourth transistor which are interconnected to form a differential amplifier with said fourth transistor biased to conduct in response to a signal of predetermined duration.

References Cited by the Examiner

UNITED STATES PATENTS

| | | | |
|---|---|---|---|
| 2,545,464 | 3/1951 | Hoeppner et al. | 328—111 |
| 3,036,225 | 5/1962 | Kladde | 307—88.5 |
| 3,050,636 | 8/1962 | Sommerfield | 307—88.5 |
| 3,171,892 | 3/1965 | Pantle | 328—111 |

ARTHUR GAUSS, *Primary Examiner.*

B. P. DAVIS, *Assistant Examiner.*